W. P. LLEWELLYN.
STONE GATHERER.
APPLICATION FILED MAR. 16, 1910.
981,440.
Patented Jan. 10, 1911.
3 SHEETS—SHEET 2.
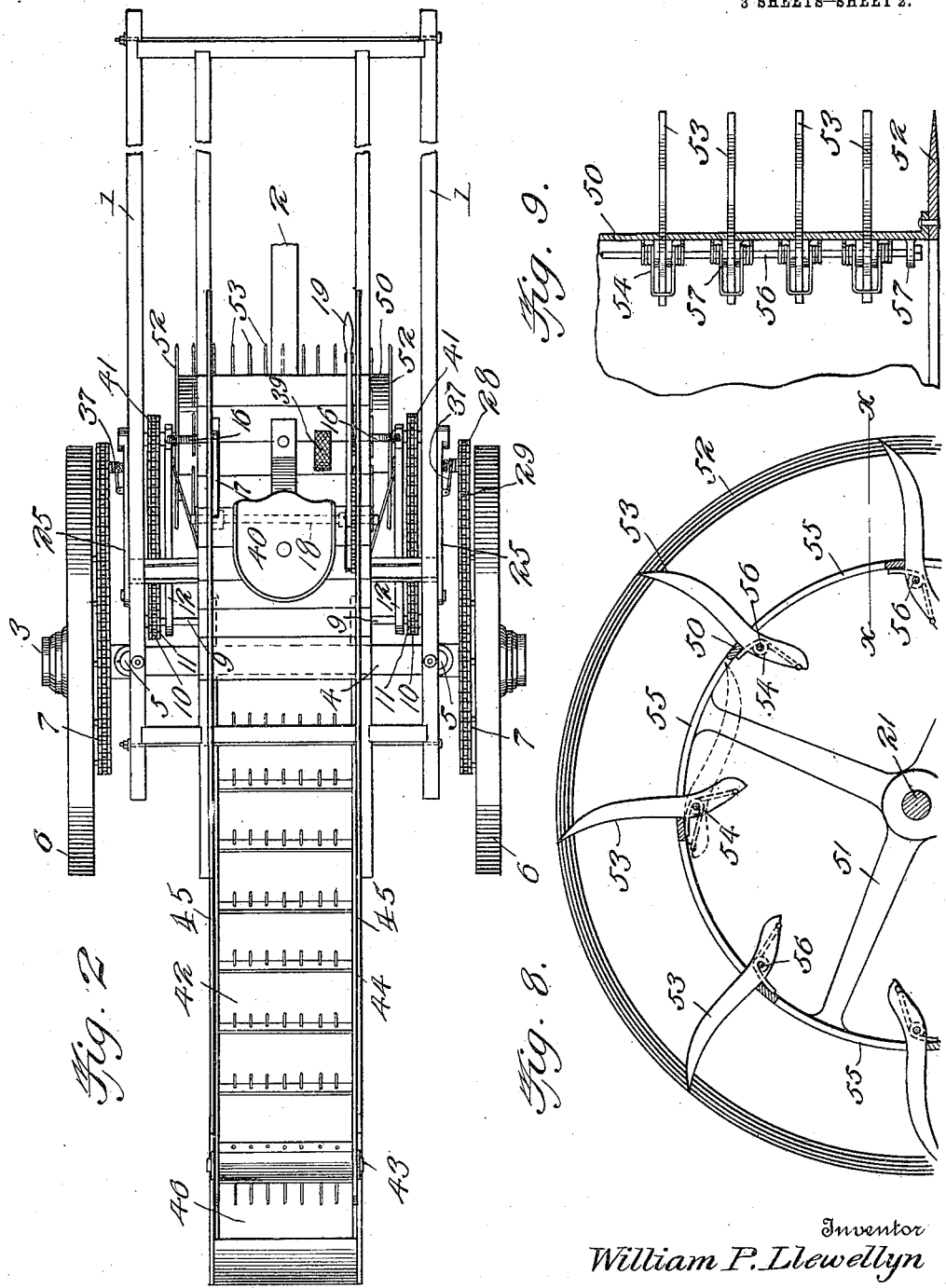
Witnesses
Frank B. Hoffman
V. B. Hillyard
Inventor
William P. Llewellyn
By Victor J. Evans
Attorney W. P. LLEWELLYN.
STONE GATHERER.
APPLICATION FILED MAR. 16, 1910
981,440.
Patented Jan. 10, 1911.
3 SHEETS—SHEET 3.
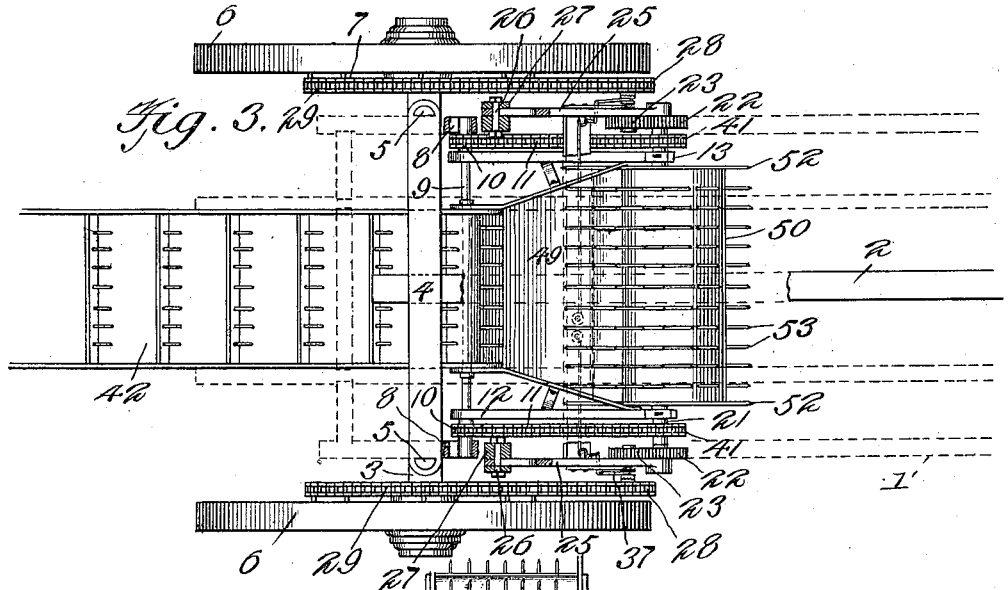
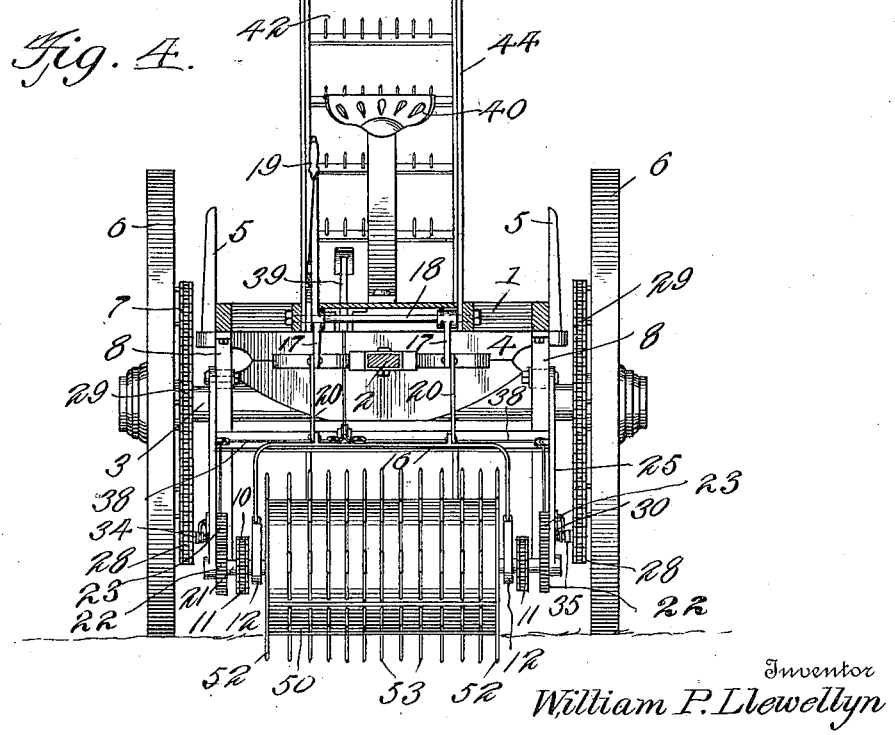
Witnesses
Frank B. Hoffman
V. B. Hillyard
Inventor
William P. Llewellyn
By Victor J. Evans
Attorney

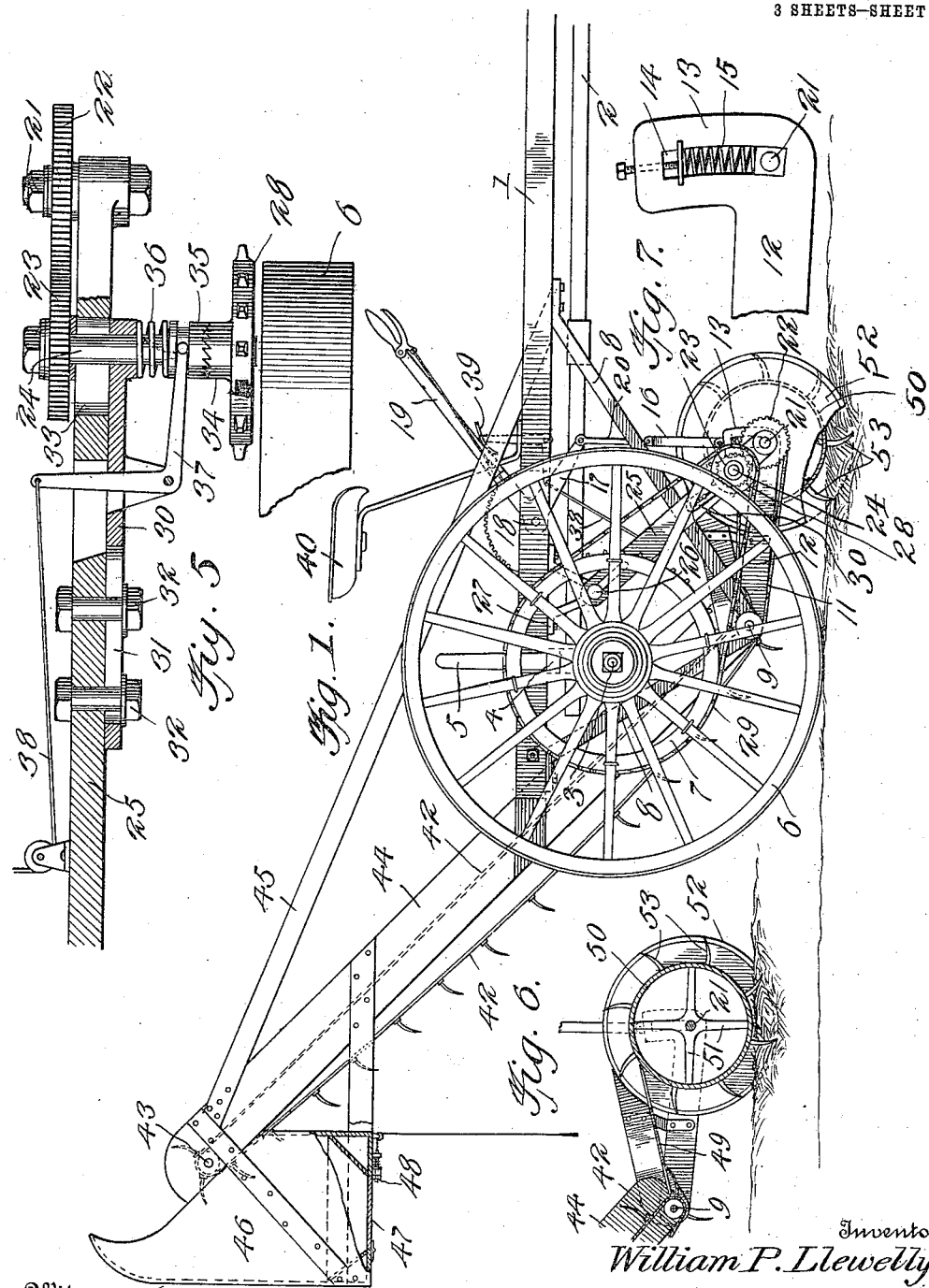

UNITED STATES PATENT OFFICE.

WILLIAM P. LLEWELLYN, OF GLENCOE, MARYLAND.

STONE-GATHERER.

981,440. Specification of Letters Patent. Patented Jan. 10, 1911.

Application filed March 16, 1910. Serial No. 549,653.

*To all whom it may concern:*

Be it known that I, WILLIAM P. LLEWELLYN, a citizen of the United States, residing at Glencoe, in the county of Baltimore and State of Maryland, have invented new and useful Improvements in Stone-Gatherers, of which the following is a specification.

The primary intent of the present invention is the provision of a machine for clearing a field of stones and kindred obstructions which prevent the successful tillage thereof, although the machine may be employed for clearing surfaces generally of obstructing matter.

The machine embodies a rotary gatherer, an elevator, means for stripping the matter picked up from the gatherer and directing the same to the elevator, a hopper for receiving the matter gathered and provided with a cut-off whereby the material gathered may be discharged at intervals, and operating means for admitting of throwing the mechanism into or out of operation and for adjusting the working parts to meet varying conditions.

The invention consists of the novel features, details of construction and combination of parts, which hereinafter will be more particularly set forth, illustrated in the accompanying drawings, and pointed out in the appended claims.

Referring to the drawings, forming a part of the application, Figure 1 is a side view of a machine embodying the invention, a part of the gatherer and a portion of the hopper being broken away. Fig. 2 is a top plan view of the mechanism. Fig. 3 is a view similar to Fig. 2, parts being broken away and parts in section. Fig. 4 is a front view of the mechanism, parts being in section. Fig. 5 is a detail section of a portion of the mechanism, showing the means for throwing the same into or out of gear and part of the power transmitting means. Fig. 6 is a sectional detail of the rotary gatherer and lower end of the elevator, showing the chute or apron for directing the material from the gatherer to the elevator. Fig. 7 is a detail view of the front end of a side bar, showing the yieldable bearing for an end of the rotary gatherer. Fig. 8 is a detail view of a portion of the rotary gatherer, showing the manner of yieldably connecting the gathering fingers with the drum. Fig. 9 is a sectional detail on the line *x—x* of Fig. 8.

Corresponding and like parts are referred to in the following description, and indicated in all the views of the drawings, by the same reference characters.

The frame 1 may be of any construction and as shown most clearly in Fig. 2 comprises a series of longitudinal bars and transverse connecting bars and rods, said frame being adapted to be secured to the running gear of an ordinary farm wagon, thereby enabling the latter to be used as a truck for supporting and driving the machine. A portion of the running gear of a farm wagon is illustrated and comprises a reach or coupling pole 2, a rear axle 3, a bolster 4 and stakes 5. The rear wheels 6 of the farm wagon are utilized as drivers for the operating mechanism of the machine and are provided with sprocket rims 7, which are clipped or otherwise secured to the wheels 6 so as to rotate therewith. Brackets 8 are pendent from opposite sides of the frame 1 near the rear thereof and support a shaft 9, which is mounted therein and provided near opposite ends with sprocket wheels 10, around which sprocket chains 11 pass. Bars 12 arranged upon opposite sides of the machine are pivotally supported at their rear ends upon the shaft 9 and extend horizontally and their front ends terminate in vertical extensions 13 in which the rotary gatherer is mounted in a manner to admit of a yielding movement of the gatherer to prevent injury thereto when meeting with an unyielding obstruction, such as a root or boulder. The vertical extensions 13 of the side bars 12 are formed with slots 14, which receive coil springs 15 and the bearings in which the shaft or journals of the rotary gatherer are mounted, the tension of the springs 15 being regulable. The said bars 12 are adapted to be raised or lowered at their front ends to elevate or depress the rotary gatherer and any means may be provided for effecting this result, such as a yoke 16, which is connected at its ends to the bars 12 and has connection intermediate of its ends with arms 17 projecting from a shaft 18 to which an operating lever 19 is attached, said operating lever being provided with the usual hand latch and toothed segment for holding the parts in adjusted position. Links 20 connect the horizontal portion of the yoke 16 with the arms 17.

The journals, or ends of the shaft 21 of the rotary gatherer, are provided with spur wheels 22 fastened thereto and which are in mesh with spur wheels 23 secured to the inner ends of stub shafts 24 adjustably connected to bars 25, which are adjustably mounted upon a shaft 26 supported at its ends in brackets 27 secured to the outer longitudinal bars of the frame 1. The stub shafts 24 are provided at their outer ends with sprocket wheels 28, which are connected by means of sprocket chains 29 with the sprocket rims 7. The stub shafts 24 are mounted in bars 30, which in turn are adjustably connected with the bars 25, thereby admitting of spur gears 23 of different sizes being employed according to the relative speed of the rotary gatherer. The bars 30 have longitudinal slots 31 at their upper rear ends, which receive bolts or fastenings 32 by means of which the said bars 30 are secured to the bars 25 in the adjusted position. Longitudinal slots 33 are formed in the bars 25 through which the stub shafts 24 pass and in which said stub shafts move when the bars 30 are adjusted on the bars 25. The sprocket wheels 28 are formed upon their inner sides with half clutches 34, which coöperate with half clutches 35 slidably mounted upon the stub shafts 24 and keyed thereto. Coil springs 36 normally press the half clutches 35 outward into engagement with the half clutches 34. Bell cranks 37 mounted upon the adjustable bars 30 have one arm in engagement with the clutch members 35 and the other arm connected by means of a cord 38 with a bell crank foot lever 39 mounted upon the framework 1 of the attachment. Pressure exerted upon the foot lever 39 exerts a pull upon both cords 38 and throws the operating mechanism out of gear. Both levers 19 and 39 are located within convenient reach of the driver's seat 40.

The shaft 9 is adapted to be driven from the shaft 21 of the rotary gatherer by means of the sprocket chains 11, which pass around sprocket wheels 41 secured to said shaft 21 and around the sprocket wheels 10 provided upon the shaft 9. An elevator belt 42 is supported at its lower end upon the shaft 9 and receives motion therefrom and is supported at its upper end by means of a shaft 43 mounted in a framework 44, which is secured to the frame 1 and brackets 8 and which is strengthened by means of braces 45. The elevator belt 42 may consist of an apron of any formation provided at intervals with lags to which teeth are secured, the latter engaging stones or other accumulations collected by the rotary gatherer so as to deliver the same into a hopper 46, which is secured to the upper rear end of the elevator frame 44 and which is provided with a hinged bottom 47, which is adapted to be released at intervals to permit of the stones and other accumulations discharging. A spring actuated latch 48 serves to hold the bottom 47 closed and when sprung releases said bottom and admits of the same swinging downward and the load discharging. A wagon or other receptacle is placed beneath the hopper to receive the accumulations discharged therefrom.

An apron or chute 49 spans the space between the lower end of the elevator and the rotary gatherer and serves to direct the stones or other material gathered to the elevator. The ends of the chute or apron 49 are formed with slots for the teeth of the elevator and rotary gatherer to pass through. The chute or apron 49 is closed at its sides to prevent any of the material passing over the edges thereof. The bottom of the chute or apron inclines rearwardly and downwardly so as to direct the material delivered from the rotary gatherer to the elevator.

The rotary gatherer comprises a drum 50, which is secured to the outer ends of spiders 51 mounted upon the shaft 21. Flanges or rims 52 are provided at the ends of the drum 50 to support the rotary gatherer and to prevent stones or other material escaping from the ends thereof. A series of teeth 53 are pivotally mounted upon the drum and are held in operative position by means of springs 54, thereby admitting of the teeth 53 yielding when meeting with a root or other unyielding obstruction. The drum 50 is provided with circumferential slots 55 through which the teeth are adapted to pass, as indicated by the dotted lines in Fig. 8, so as not to be injured when coming in contact with an unyielding obstruction. The instant the teeth clear the obstruction they are forced outward into operative position by the springs 54. Rods 56 are mounted upon the inner side of the drum 50 and the teeth 53 are mounted thereon so as to project outward beyond the drum and inward therefrom a distance to insure positive action of the springs 54. Lugs 57 project inward from the drum 50, a pair being provided for each of the slots 55 and for the teeth 53, the latter being received between a pair of lugs 57. The springs 54 are approximately of U-form, their side members being formed with coils through which the rods 56 pass. The closed ends of the springs 54 engage the inner ends of the teeth 53, whereas the outer ends of the side members engage the drum 50. The springs 54 normally exert a pressure upon the teeth 53 to hold the same projected, the forward closed ends of the slots 55 serving as stops to limit the forward movement of the teeth and hold the same in proper position. The teeth 53 curve in their length so as to pick up the stones and retain the same until delivered to the apron or chute 49.

In the practical operation of the invention the frame 1 is attached to the running gear of an ordinary farm wagon, it being understood that the rear wheels 6 of such wagon be provided with sprocket rims 7, which latter are connected by sprocket chains 29 with the sprocket wheels 28, whereby movement may be imparted to the rotary gatherer and to the elevator as the machine is drawn over the field. After the parts have been adjusted and the farm wagon with the mechanism attached is drawn over the field the stones in the path of the rotary gatherer are picked up and delivered upon the apron or chute 49 and are directed thereby to the elevator, which latter deposits the material gathered into the hopper 46, from which, as stated, it is discharged at intervals by releasing the latch 48. The rotary gatherer may be raised or lowered by manipulation of the operating lever 19 in the manner stated and when it is required to throw the mechanism out of action pressure is exerted upon the foot lever 39. To change the relative speed of the rotary gatherer the spur wheel 23 may be replaced by another of different size.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a stone gathering machine the combination of a frame, pivotally mounted bars, a rotary gatherer yieldingly mounted in the free ends of said pivoted bars, a second set of bars mounted at one end and adapted to have a limited play and having said rotary gatherer mounted in the opposite ends thereof, spur gears fastened to the shaft of the rotary gatherer, intermeshing spur gears adjustably mounted upon the second set of bars, and means for imparting movement to the second set of spur gears.

2. In a gathering machine of the character described, the combination of a framework, a rotary gatherer, bars supporting the rotary gatherer, spur gears secured to the shaft of the rotary gatherer, stub shafts adjustably mounted upon the said bars, spur gears secured to said stub shafts and adapted to mesh with the spur gears fastened to the shaft of the rotary gatherer, and means for imparting movement to said stub shafts.

3. In a machine of the character described, the combination of a main frame, a rotary gatherer, bars supporting the rotary gatherer, a second set of bars adjustably mounted upon the first mentioned bars, stub shafts mounted in the second set of bars, gear elements between the stub shafts and rotary gatherer, and means for imparting rotary movement to the stub shafts.

4. In a machine of the character described, the combination of a main frame, a rotary gatherer, bars supporting the rotary gatherer, a second set of bars adjustably mounted upon the first mentioned bars, stub shafts mounted in the second set of bars, gear elements between the stub shafts and rotary gatherer, gear elements loosely mounted upon the stub shafts and adapted to have movement imparted thereto, a clutch comprising elements, one of which is provided upon said gear element and the other loose upon the stub shaft and rotatable therewith, and a lever for throwing the clutch out of gear and mounted upon the second bar.

5. In a mechanism of the character described, the combination of pivoted bars, a rotary gatherer yieldingly mounted in the pivoted bars, a second set of bars having a limited play at one end and mounted upon the shaft of the rotary gatherer at their opposite ends, spur gears secured to the shaft of the rotary gatherer, stub shafts, a third set of bars supporting the stub shafts and adjustable upon the said second set of bars, spur gears fast to the stub shafts and in mesh with the spur gears of the rotary gatherer, gear elements loose upon the stub shafts and adapted to have power imparted thereto, clutches for connecting said gear element to the stub shafts, and means for throwing the clutches out of gear comprising levers mounted upon the third set of bars.

In testimony whereof I affix my signature in presence of two witnesses.

WILLIAM P. LLEWELLYN.

Witnesses:
J. ROYALL LIPPERT,
GEORGE L. MATTINGLY.